(12) United States Patent
Diemer et al.

(10) Patent No.: US 8,919,518 B2
(45) Date of Patent: Dec. 30, 2014

(54) TABBED CLUTCH PLATES

(75) Inventors: Larry D. Diemer, Clarkston, MI (US); Todd R. Berger, Pinckney, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 229 days.

(21) Appl. No.: 13/595,353

(22) Filed: Aug. 27, 2012

(65) Prior Publication Data

US 2014/0054125 A1     Feb. 27, 2014

(51) Int. Cl.
*F16D 13/52* (2006.01)
*F16D 13/69* (2006.01)

(52) U.S. Cl.
USPC .................. 192/70.28; 192/85.43; 192/107 C

(58) Field of Classification Search
USPC ............ 192/70.14, 70.2, 70.27, 70.28, 85.43, 192/107 C
See application file for complete search history.

(56) References Cited

U.S. PATENT DOCUMENTS

| | | | | | |
|---|---|---|---|---|---|
| 2,174,240 | A | * | 9/1939 | Glenney | 192/70.28 |
| 2,738,864 | A | * | 3/1956 | Becker | 192/70.14 |
| 4,058,027 | A | * | 11/1977 | Webb | 192/107 C |
| 4,548,306 | A | * | 10/1985 | Hartz | 192/70.28 |
| 4,676,356 | A | * | 6/1987 | Beccaris et al. | 192/70.28 |
| 4,940,124 | A | * | 7/1990 | Galuska et al. | 192/70.28 |
| 4,958,712 | A | * | 9/1990 | Suganuma et al. | 192/70.28 |
| 5,460,255 | A | * | 10/1995 | Quigley | 192/70.14 |
| 6,026,944 | A | * | 2/2000 | Satou et al. | 192/70.28 |
| 6,939,427 | B1 | * | 9/2005 | Anma et al. | 156/265 |
| 8,047,337 | B2 | * | 11/2011 | Strandberg et al. | 192/70.14 |
| 8,056,694 | B2 | * | 11/2011 | Samie | 192/70.2 |
| 8,408,375 | B2 | * | 4/2013 | Copeland | 192/70.28 |
| 8,640,842 | B2 | * | 2/2014 | Degowske | 192/70.28 |
| 2009/0229905 | A1 | * | 9/2009 | Kato et al. | 192/70.27 |
| 2010/0274456 | A1 | * | 10/2010 | Kondo et al. | 192/70.28 |
| 2013/0270054 | A1 | * | 10/2013 | Dziurda | 192/70.28 |

* cited by examiner

*Primary Examiner* — Jacob S Scott

(57) ABSTRACT

A multiple plate friction clutch includes clutch plates or discs having reduced frictional (spin) losses and thus reduced heat generation and improved service life. The clutch plates include both leaf springs or spring tabs at the periphery of the clutch plate that axially bias adjacent plates away from one another and a reduced area of friction material that contacts an adjacent reaction plate. On a typical motor vehicle automatic transmission clutch, a total of six or eight leaf springs or tabs are utilized: with three or four offset to one side and three or four offset to the other side.

17 Claims, 3 Drawing Sheets

TABBED CLUTCH PLATES

FIELD

The present disclosure relates to clutch plates for friction clutches in automatic transmissions and similar devices and more particularly to clutch plates for friction clutches in automatic transmissions and similar devices having both spring biasing tabs and reduced friction surface area which reduce spin losses and improve fuel economy.

BACKGROUND

The statements in this section merely provide background information related to the present disclosure and may or may not constitute prior art.

Vast numbers of automatic transmissions installed in motor vehicles utilize a plurality of friction clutches and brakes. Basically these devices include a first plurality of clutch plates or discs coupled to a first member which are interleaved with a second plurality of clutch plates or discs coupled to a second member. An adjacent actuator which may be electrically, hydraulically or pneumatically powered engages and releases the device. If the device is a clutch both members are capable of rotation and one is typically an input and the other an output. If the device is a brake, one member is capable of rotation and the other is grounded (stationary).

As common as these devices are, and because of this, given the engineering effort expended upon them, it may be surprising that they are not without their drawbacks. When these devices are utilized in automatic transmissions, typically between components of planetary gear assemblies, the speed across an open clutch or brake may exceed 5,000 r.p.m. Operation at such speeds invariably results in heat generation which in itself can be an issue but which also results in spin losses and reduces the efficiency of the transmission and the entire powertrain. Reducing the speed across the clutch or brake is one possible solution but it often involves many operational compromises. Accordingly, research directed to the problem of reducing clutch drag at all operating speeds is ongoing and the present invention is the result of such research.

SUMMARY

The present invention provides clutch plates or discs for use in multiple plate friction clutches having reduced frictional (spin) losses and thus reduced heat generation and improved service life. The clutch plates include both leaf springs or spring tabs at the periphery of the clutch plate that axially bias adjacent plates away from one another and reduced area of friction material that contacts an adjacent reaction plate. In a typical motor vehicle automatic transmission clutch incorporating the present invention, a total of six or eight leaf springs or tabs are utilized: with three or four offset to one side and three or four offset to the other side. The surface area of the friction material is reduced but still large enough that the compressive (elastic) limit of the friction material is not exceeded when maximum engagement, i.e., compressive force is applied by the clutch actuator.

Thus it is an aspect of the present invention to provide a clutch disc having a plurality of leaf springs or tabs disposed about its periphery.

It is a further aspect of the present invention to provide a clutch disc having a reduced area of friction material relative to previous clutch designs.

It is a still further aspect of the present invention to provide a clutch disc having both a plurality of leaf springs disposed about its periphery and a reduced area of friction material.

It is a still further aspect of the present invention to provide a friction clutch having plates or discs with reduced areas of friction material of sufficient area that the elastic limit of the friction material is not exceeded when maximum engagement force is applied to the clutch by an operator.

It is a still further aspect of the present invention to provide a friction clutch having reduced spin losses.

It is a further aspect of the present invention to provide a friction clutch which generates less heat in a disengaged state.

It is a further aspect of the present invention to provide a friction clutch which exhibits improved service life.

Further aspects, advantages and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
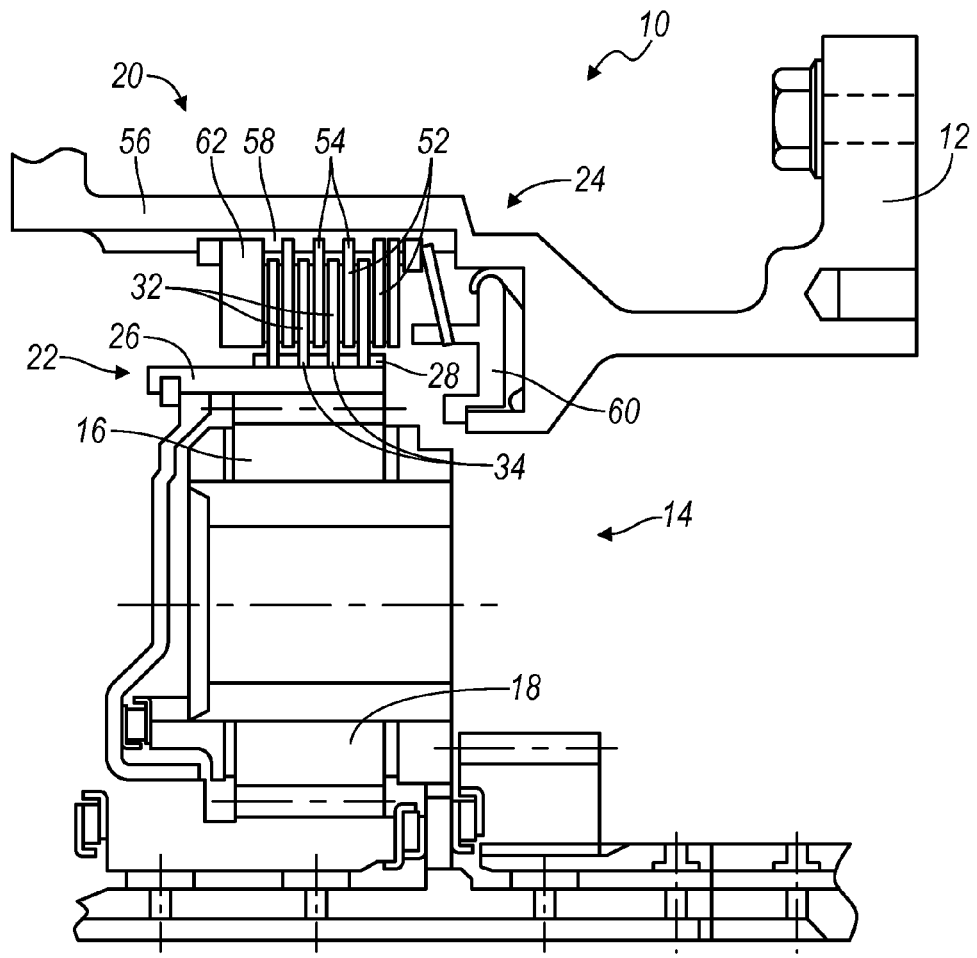
FIG. 1 is a fragmentary, sectional view of a typical automatic transmission having a friction clutch assembly according to the present invention disposed therein.

With reference to FIG. 1, a portion of an automatic transmission incorporating a friction clutch assembly according to the present invention is illustrated and generally designated by the reference number 10. The automatic transmission 10 includes a housing 12 which encloses, supports, locates and protects various components such as a planetary gear assembly 14 having a first element 16, a second element 18 and a third element and a friction clutch assembly 20. The friction clutch assembly 20 includes an input or first member 22 which may be coupled to or driven by, for example, the first element 16 of the planetary gear assembly 14 and an output or second member 24 which may be coupled to or be a portion of, for example, the housing 12 or an element of the planetary gear assembly 14. In the former case, the device may be more commonly referred to as a friction brake—a distinction that is of little moment with regard to the present invention.

Figure 2:
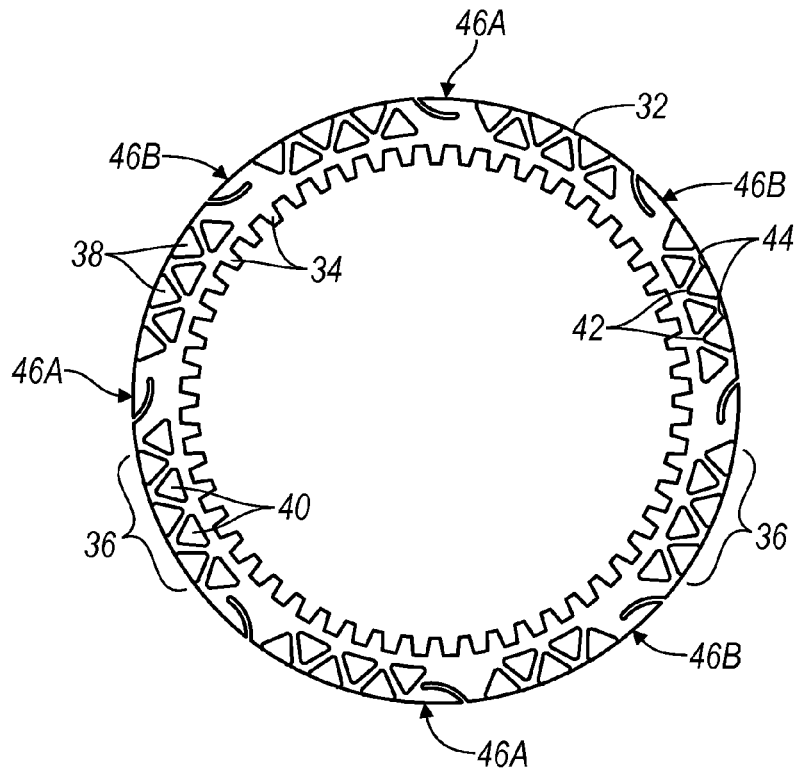
FIG. 2 is a plan view of a first embodiment of a friction clutch plate or disc according to the present invention.

Referring now to FIGS. 1 and 2, the input or first member 22 of the friction clutch assembly 20 typically defines or includes a hub 26 having axial external (male) splines 28 on its outer surface. A first plurality of friction clutch plates or discs 32 include internal (female) splines 34 which are complementary to and engage the external splines 28 on the hub 26 of the first or input member 22. The first plurality of friction clutch plates 32 includes spaced apart, triangular regions or islands of friction material 36. The first plurality of friction clutch plates 32 thus rotate with the first or input member 22 but are free to translate axially on the hub 26 of the first member 22.

Interleaved with the first plurality of friction clutch plates 32 are a second plurality of reaction plates or discs 52 which include external (male) splines 54. The reaction plates or discs 52 are essentially circular, flat steel plates against which the friction plates or discs 32 make rotating frictional contact. The second plurality of reaction plates or discs 52 are disposed within a cylindrical housing 56 having internal (female) splines 58 which are complementary to and engage the external splines 54 on the second plurality of reaction plates or discs 52. The second plurality of reaction plates or discs 52 are thus coupled to the output member 24 and are free to translate axially within the cylindrical housing 56.

The friction clutch assembly 20 also includes an actuator or operator 60 that may be electrically, hydraulically or pneumatically activated to compress the interleaved pluralities of clutch plates or discs 32 and 52 to transfer torque from the input member 22 to the output member 24 or deactivated to relax pressure on the interleaved pluralities of clutch plates or discs 32 and 52 and terminate torque transfer from the input member 22 to the output member 24. The friction clutch assembly 20 may also include components such as a stop plate 62 and a thrust bearing (not illustrated).

Figure 3:
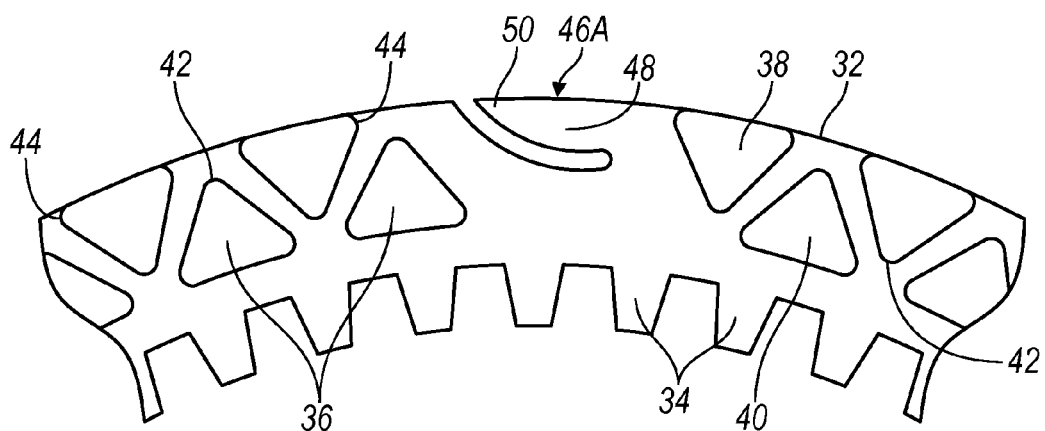
FIG. 3 is an enlarged, fragmentary view of a portion of a first embodiment of a friction clutch plate or disc according to the present invention.

Referring now to FIGS. 2 and 3, a first embodiment of the friction plates or discs 32 includes the uniform pattern of alternately arranged triangles or triangular segments of friction material 36 with a first portion 38 arranged with flat sides adjacent the periphery of the plate or disc 32 and a second portion 40 interleaved with the first portion 38 with flat sides near the inner edge of the plate or disc 32. The inward and outward radial ends of the triangles or triangular segments of friction material 36 have radiused corners 42 whereas the opposite pair of corners 44 are slightly truncated. Thus the triangles of friction material 36 form a repeated pattern of interrupted or discontinuous isolated regions or islands of friction material. It should be appreciated that while the total area of friction material 36 in the present invention is smaller than in conventional clutches, the area reduction is not and cannot be so small as to cause the remaining friction material 36 to exceed its elastic limit when full compressive force is applied to it by the clutch operator 60, illustrated in FIG. 1.

Figure 4:
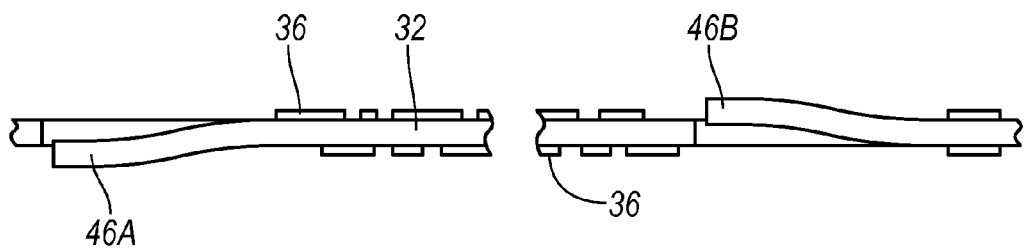
FIG. 4 is an enlarged, side view of a first embodiment of a friction clutch plate or disc according to the present invention.

As illustrated in FIGS. 2, 3 and 4, at eight locations around the periphery of the friction plate or disc 32 are leaf springs or tabs 46A and 46B. Four of the leaf springs or tabs 46A are formed or oriented in one direction away from the plane of the friction plate or disc 32 and another, alternating four leaf springs or tabs 46B are formed or oriented in an opposite direction away from the plane of the friction plate or disc 32. The actual number of leaf springs or tabs 46A and 46B depends upon the size, i.e., outside diameter, of the friction plate or disc 32. Preferably, a total of six leaf springs or tabs 46A and 46B will be the minimum number formed and utilized on smaller friction plates or discs 32 with a total of eight, ten, twelve or more leaf springs or tabs 46A and 46B formed and utilized on larger friction plates or discs 32. Each of the leaf springs or tabs 46A and 46B has a generally triangular body 48 which tapers to a radiused end 50 as illustrated in FIG. 3.

At each of the locations of a leaf spring or tab 46A and 46B, on each side of the friction plate or disc 32, the triangles of friction material 36 are omitted in order to provide unhindered and unrestricted movement of the leaf springs or tabs 46A and 46B. By way of example, in the configuration illustrated in FIG. 2, two of the triangles of friction material 36 are omitted on each face of the friction plate or disc 32 adjacent each of the leaf springs or tabs 46A and 46B.

Figure 5:
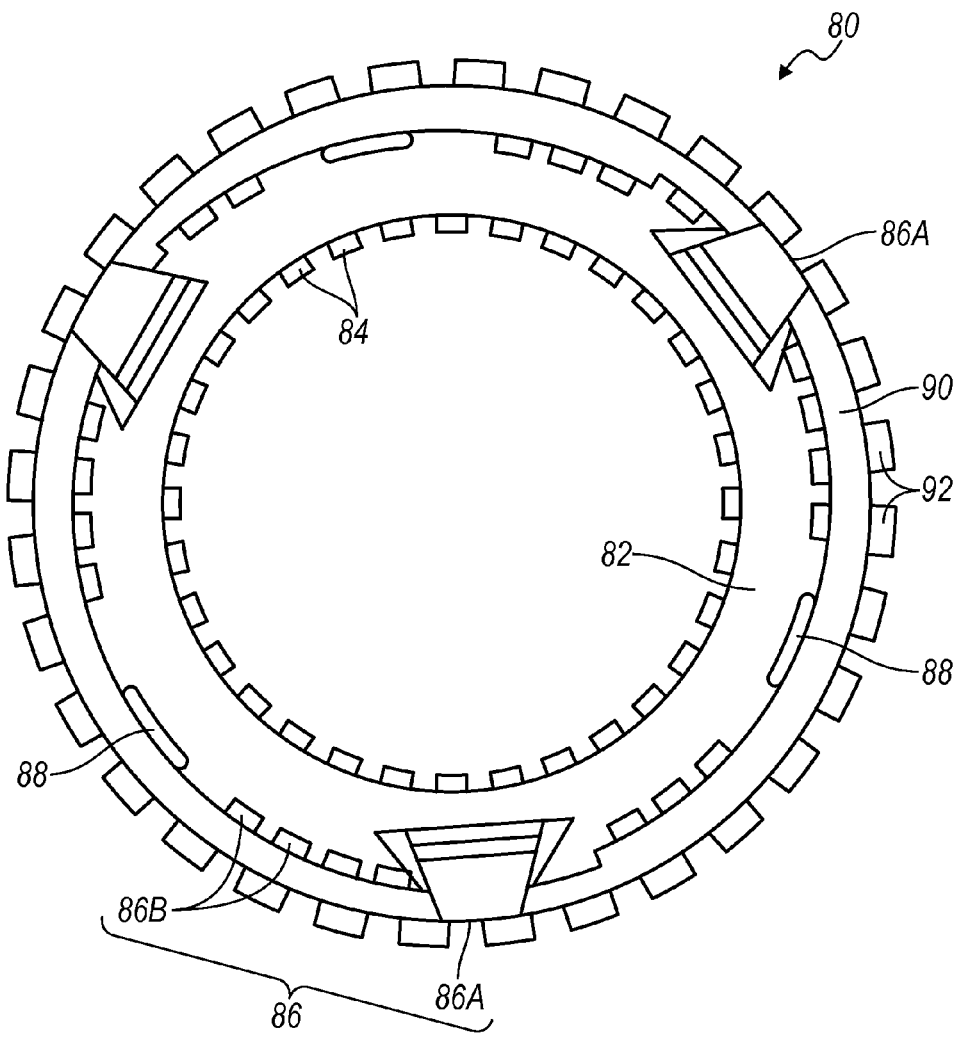
FIG. 5 is a plan view of a second embodiment of a friction clutch plate or disc according to the present invention.
Figure 6:
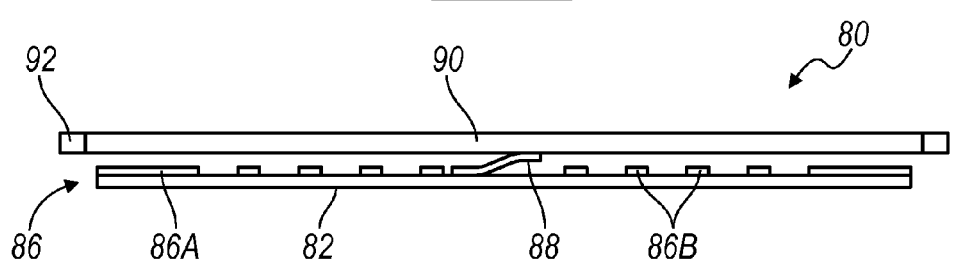
FIG. 6 is an enlarged, side view of a second embodiment of a friction clutch plate or disc and reaction plate according to the present invention.

Referring now to FIGS. 5 and 6, a second embodiment of a friction clutch plate or disc and reaction plate assembly according to the present invention is illustrated and generally designated by the reference number 80. The friction clutch plate or disc and reaction plate assembly 80 which will be utilized in multiples in a friction clutch such as the friction clutch assembly 20 of FIG. 1, includes a first fiber core clutch plate or disc 82 which includes internal (female) splines 84 which are complementary to and engage external splines such as the external splines 28 on the hub 26 illustrated in FIG. 1. The fiber core clutch plate 82 includes spaced apart regions or islands of friction material 86. Specifically, the friction material 86 is arranged in two patterns: a first pattern includes three larger trapezoidal regions or pads 86A that are preferably disposed at 120° spaced apart circumferential locations on both faces of the fiber core clutch plate 82. A second pattern includes a plurality of smaller rectangles 86B arranged discontinuously on one or both faces of the fiber core clutch plate 82 in a circle aligned with the approximate radial midpoint of the trapezoidal regions 86A. It should again be appreciated that although the total surface area of the friction material 86 on the fiber core clutch plate or disc 82 is smaller than on conventional clutch plates, the area reduction is limited, that is, the area is not and cannot be so small as to cause the compressive forces on the remaining friction material 86 to exceed its elastic limit when the clutch operator 60, illustrated in FIG. 1, delivers maximum compressive force.

At three locations on one or both faces of the fiber core clutch plate 82, leaf springs or tabs 88 are affixed to bias an adjacent reaction plate 90 axially away from the fiber core clutch plate 82. Once again, the number of leaf springs or tabs 88 utilized on the fiber core clutch plate 82 will depend upon its diameter, with smaller plates 82 utilizing fewer springs or tabs and larger plates 82 utilizing more springs or tabs 88.

The reaction plate 90 is, as noted above, essentially a flat, circular, steel plate having a plurality of external (male) splines 92 disposed about its periphery. The external splines 92 are complementary to and engage internal splines such as the internal splines 58 on the cylindrical housing 56 illustrated in FIG. 1.

It will this be appreciated that the two embodiments of the friction clutch plates or discs 32 and the fiber core clutch plates or discs 82 described herein provide reduced spin losses in clutches as a result of the plate or disc separating forces provided by the leaf springs or tabs 46A, 46B and 88. Such reduced spin losses manifest themselves in reduced heat generation within the clutch and improved vehicle fuel economy—two highly desirable operational benefits.

The description of the invention is merely exemplary in nature and variations that do not depart from the gist of the invention are intended to be within the scope of the invention. Such variations are not to be regarded as a departure from the spirit and scope of the invention.

What is claimed is:

1. A friction clutch assembly having reduced spin loss comprising, in combination, a first member defining a plurality of axially oriented male splines, a second member disposed coaxially with said first member and defining a plurality of axially oriented female splines, a first plurality of clutch plates having female splines complementary to and engaging said male splines in said first member and a circular outer edge, a second plurality of clutch plates interleaved with said first plurality of clutch plates and having male splines complementary to and engaging said female splines on said second member, and said first plurality of clutch plates having an even numbered plurality of circumferentially extending leaf springs, one half of said plurality of leaf springs extending in one axial direction from said first plurality of clutch plates and another one half of said plurality of leaf springs extending in an opposite axial direction from said first plurality of clutch plates, each of said leaf springs having an outer edge coinciding with said circular outer edge and a plurality of discontinuous regions of friction material on faces of said first plurality of clutch plates.

2. The friction clutch assembly of claim 1 further including a hydraulic actuator disposed adjacent said pluralities of clutch plates for applying compressive force to said clutch plates.

3. The friction clutch assembly of claim 1 further including a stationary housing and wherein one of said pluralities of clutch plates is operably coupled to said housing.

4. The friction clutch assembly of claim 1 wherein said plurality of leaf springs includes eight leaf springs, four of said leaf springs extending in one axial direction and alternating with four of said leaf springs extending in the opposite axial direction.

5. The friction clutch assembly of claim 1 wherein said regions of friction material include a plurality of triangular segments, a portion of said triangular segments oriented in a first direction and a second portion of said triangular segments oriented in a second direction opposite to said first direction.

6. The friction clutch assembly of claim 1 wherein said regions of friction material are omitted proximate said leaf springs on both faces of said first plurality of clutch plates.

7. The friction clutch assembly of claim 1 wherein said regions of friction material include larger trapezoidal regions and smaller rectangular regions disposed between said larger trapezoidal regions.

8. The friction clutch assembly of claim 1 wherein said second plurality of clutch plates are reaction plates.

9. An improved friction clutch having reduced spin loss comprising, in combination,
- an input member defining a plurality of axially oriented external splines,
- an output member disposed coaxially with said input member and defining a plurality of axially oriented internal splines,
- a second plurality of clutch plates interleaved with a first plurality of clutch plates and having external splines complementary to and engaging said internal splines on said output member,
- said first plurality of clutch plates having a plurality of circumferentially extending curved leaf springs, a portion of said plurality of leaf springs extending in one axial direction from said first plurality of clutch plates and another portion of said plurality of leaf springs extending in an opposite axial direction from said first plurality of clutch plates, each of said plurality of leaf springs having an outer edge forming a portion of said circular outer edge and a plurality of discontinuous regions of friction material.

10. The friction clutch assembly of claim 9 further including a hydraulic actuator disposed adjacent said pluralities of clutch plates for applying compressive force to said pluralities of clutch plates.

11. The friction clutch assembly of claim 9 further including a stationary housing and wherein one of said pluralities of clutch plates is operably coupled to said housing.

12. The friction clutch assembly of claim 9 wherein said plurality of leaf springs includes eight leaf springs, four of said leaf springs extending in one axial direction and four of said leaf springs extending in the opposite axial direction.

13. The friction clutch assembly of claim 9 wherein said regions of friction material include a plurality of triangular segments.

14. The friction clutch assembly of claim 9 wherein said second plurality of clutch plates are reaction plates.

15. A friction clutch assembly having reduced spin loss comprising, in combination,
- a first member defining a first plurality of axially oriented splines,
- a second member disposed coaxially with said first member and defining a second plurality of axially oriented splines,
- a first plurality of clutch plates having splines complementary to and engaging said first plurality of splines in said first member,
- a second plurality of clutch plates interleaved with said first plurality of clutch plates and having splines complementary to and engaging said second plurality of splines on said second member,
- one plurality of said first and second pluralities of clutch plates including a plurality of leaf springs extending in one circumferential direction, one half of said plurality of leaf springs formed to curve in one axial direction from said one of said plurality of clutch plates and another one half of said plurality of leaf springs formed to curve in an opposite axial direction from said one of said plurality of clutch plates and a plurality of discontinuous regions of friction material on each face of said one plurality of clutch plates, and
- another plurality of said first and second pluralities of clutch plates being reaction plates.

16. The friction clutch assembly of claim 15 further including an actuator disposed adjacent said pluralities of clutch plates for applying compressive force to said clutch plates.

17. The friction clutch assembly of claim 15 wherein said regions of friction material include a plurality of triangular segments, a portion of said triangular segments oriented in a first direction and a second portion of said triangular segments oriented in a second direction opposite to said first direction.

* * * * *